United States Patent [19]

Taich et al.

[11] 4,041,772
[45] Aug. 16, 1977

[54] APPARATUS FOR LOCATING PUNCTURES IN TIRES

[75] Inventors: Albert Taich, Chicago; Theodore Gill, Northlake, both of Ill.

[73] Assignee: Consumer Tire & Supply Co., Inc., Chicago, Ill.

[21] Appl. No.: 718,174

[22] Filed: Aug. 27, 1976

[51] Int. Cl.² .............................................. G01M 3/06
[52] U.S. Cl. ................................................ 73/45.6
[58] Field of Search ................................ 73/45.6, 49

[56] References Cited

U.S. PATENT DOCUMENTS

| | | | |
|---|---|---|---|
| 1,416,649 | 5/1922 | Knott | 73/45.6 |
| 1,854,556 | 4/1932 | Moebes et al. | 73/45.6 |
| 1,867,015 | 7/1932 | Lundy | 73/45.6 |
| 2,302,099 | 11/1942 | Bittner | 73/45.6 |
| 2,672,752 | 3/1954 | Crothers | 73/45.6 |
| 2,902,856 | 9/1959 | Taich et al. | 73/45.6 |

FOREIGN PATENT DOCUMENTS 1,005,239  12/1951  France .............................. 73/45.6

Primary Examiner—Richard C. Queisser
Assistant Examiner—Joseph W. Roskos
Attorney, Agent, or Firm—Robert L. Lindgren; Edward D. Gilhooly; Davis Chin

[57] ABSTRACT

An apparatus for locating punctures in a tubeless tire includes a lifting element for raising and lowering a tire into a tank of water and a power device operatively connected to a spider for urging the tire downwardly beneath the level of the water in the tank. A pressure regulator is suitably connected to the power device for controlling accurately the amount of pressure applied by the power device upon the tire. A pair of counterweights are also provided for connection to the power device for lifting the spider.

4 Claims, 4 Drawing Figures

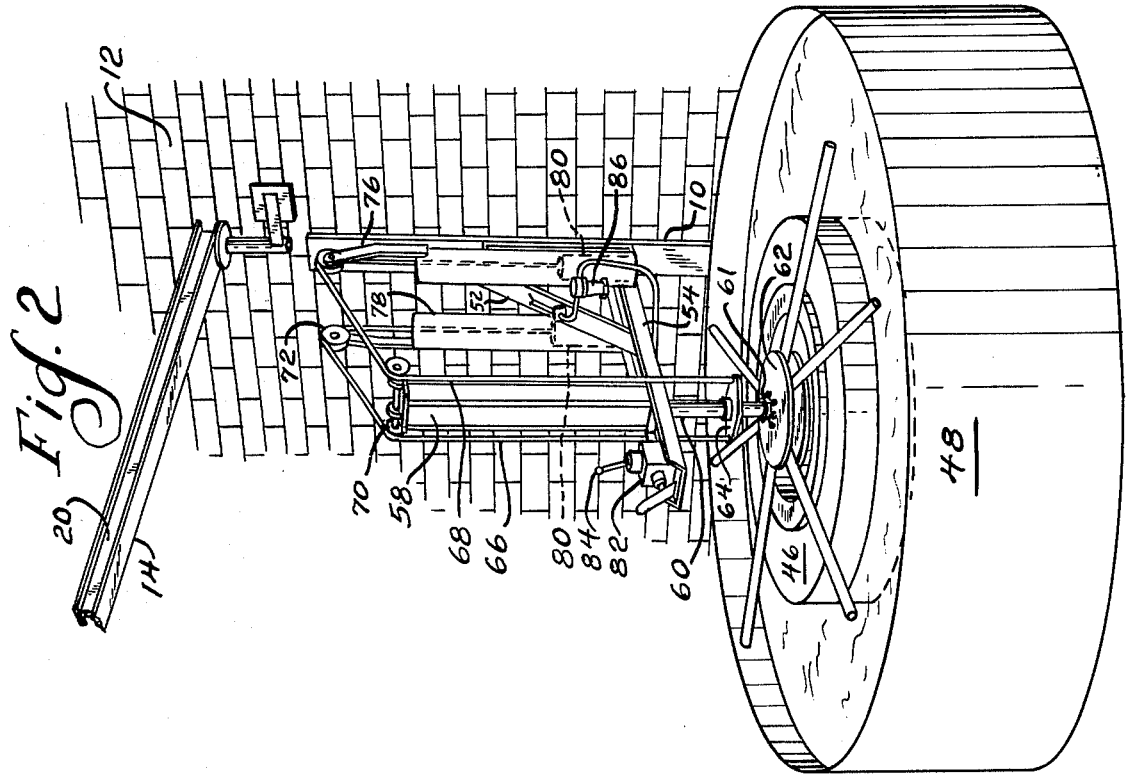

APPARATUS FOR LOCATING PUNCTURES IN TIRES

BACKGROUND OF THE INVENTION

This invention relates generally to apparatuses for locating punctures or leaks in tires and more particularly, it relates to an apparatus for locating punctures in tubeless tires wherein there are provided a pressure regulator for controlling the pressure on a power device and couterweights for facilitating the lifting of a spider connected to a piston rod in the power device.

In the prior art puncture locaters of the type utilizing a cylinder and piston, a spider is connected to a piston rod fixed to the piston and is actuated by the cylinder for pushing a tire below the level of water in a tank. For the purposes of completeness, reference is being made to our prior U.S. Pat. No. 2,902,856 assigned to the same assignee, wherein a puncture locater having a cylinder containing a piston connected to a piston rod for actuating a spider is described and illustrated with application to tubeless tires.

In such prior art devices, the cylinder and piston assembly is energized by a control button for urging the spider downwardly against the top of the tire in order to force the entire tire beneath the level of the water in the tank. Dependent upon the size and weight of the large tires used on wheels such as that of trucks and trailers, the amount of force or pressure necessary to immerse them in the water would vary. However, there was no provision for controlling or setting the amount of pressure needed by the cylinder to immerse the tires. Thus, an operator had only to guess by looking at the tire to determine what amount of pressure would be required. Frequently, when too much pressure was applied on the smaller tires, the water in the tank would be splashed out onto the working areas or floor. Other times, when the pressure was not enough for submerging the larger tires, the operator had to slowly apply increased amounts of pressure onto the tire until it was completely submerged which is a very time consuming process. It would, therefore, be desirable to provide a pressure regulator operatively connected to the cylinder and piston assembly for controlling and setting the amounts of pressure as required by the size and weight of the tires.

Further, after the punctures or leaks in the tires are located the cylinder and piston assembly is de-energized for permitting the spider to return to its raised position thereby allowing the tire to be removed. However, difficulties have been encountered in the prior art devices in providing enough force for lifting or raising the spider and piston rod up to the raised position after the tire has been checked. Particularly, this problem is present in the checking of the smaller sized vehicle tires as the buoyancy force generated by the tire once the cylinder and piston assembly is de-energized is generally insufficient to overcome the weight of the piston, piston rod and spider in order to raise the same back to the upward position. Thus, it would be desirable to provide counterweights operatively connected to the piston rod so that when the cylinder and piston assembly is de-energized the piston, piston rod and spider are raised in a smooth and efficient manner thereby returning the same to the upright position.

SUMMARY OF THE INVENTION

Accordingly, it is an object of the present invention to provide an improved apparatus for locating punctures which has all of the aforementioned features and yet overcomes all of the disadvantages encountered in the prior art devices.

It is another object of the present invention to provide a new and novel apparatus for locating punctures having means for controlling the pressure on a power device.

It is still another object of the present invention to provide a new and novel apparatus for locating punctures having counterweights operatively connected to a piston rod for facilitating the lifting of a piston in a power device.

In accordance with these aims and objectives, the present invention is concerned with the provision of an apparatus for locating leaks in a tubeless tire which includes a lifting element for raising and lowering a tire into a tank of water and a power device which is operatively connected to a spider for urging the tire downwardly beneath the level of the water in the tank. In order to control accurately the amount of pressure applied by the power device upon the tire, a pressure regulator is provided which is operatively connected to the power device. Further, a pair of counterweights are connected to a piston rod in the power device for facilitating the raising of the spider to the upward position.

The instant invention is particularly efficient and economical in locating or detecting leaks in tubeless tires since it allows very precise control of the pressure for submerging the tire. Additionally, the counterweights in the present invention permit the spider to be raised to the upward position after the tire has been checked for leaks in a smooth and efficient manner.

BRIEF DESCRIPTION OF THE DRAWINGS

These and other objects and advantages of the present invention will become more apparent from the following detailed description when read in conjunction with the accompanying drawings wherein:

FIG. 1 is a perspective view of a preferred embodiment of an apparatus in accordance with the present invention, showing the spider in the raised position;

FIG. 2 is a perspective view of the apparatus as shown in FIG. 1 with the spider contacting the tires;

DESCRIPTION OF THE PREFERRED EMBODIMENTS

Figure 4:
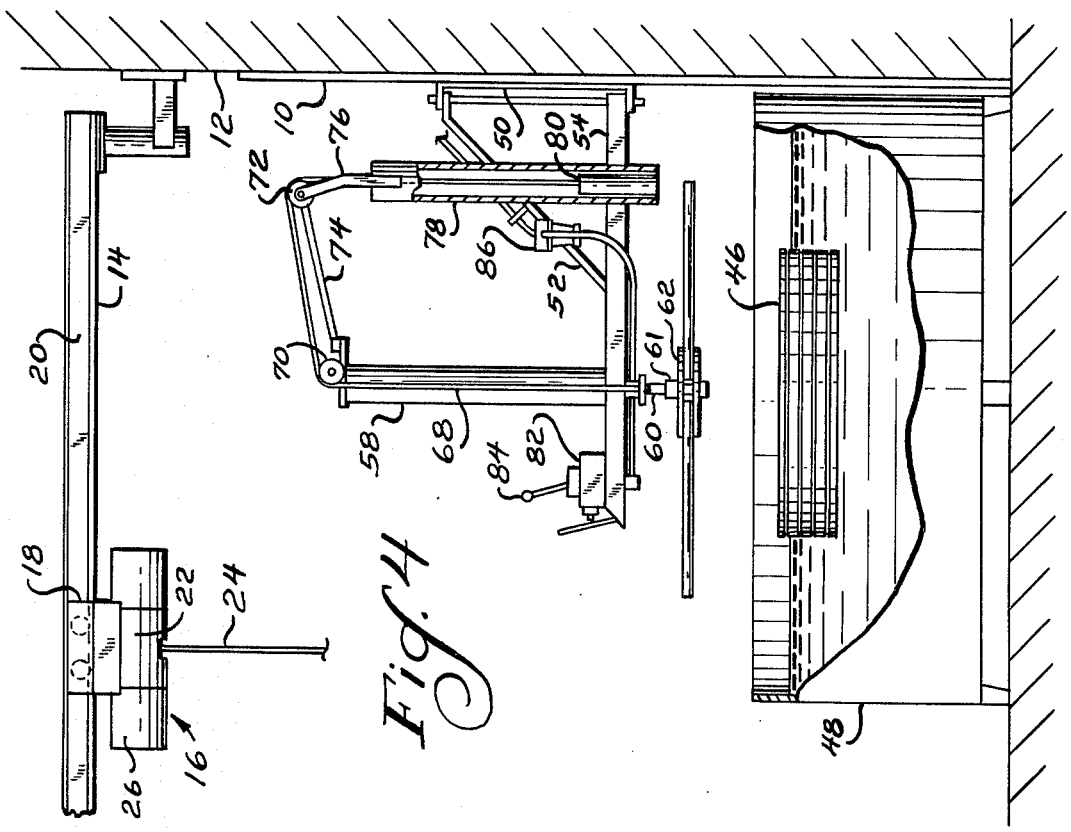
FIG. 4 is a side elevational view of the apparatus as shown in FIG. 1.

It is to be distinctly understood at the outset that the present invention shown in accordance with an apparatus for locating punctures is not intended to serve as a limitation upon the scope or teachings thereof, but is merely for the purpose for convenience of illustration of one example of this application. The present invention has numerous applications in other fields since the invention pertains to a mechanism for providing accurate control of pressure applied by a power device and the lifting of a spider connected to a piston rod in the power device.

Referring now in detail to the drawings of the particular illustration, a puncture locating apparatus comprises a vertical column member 10 secured to a building structure such as a wall 12 in any convenient manner. Disposed above the upper end of the column member 10, there is an I-beam 14 which is also affixed to the wall 12 in any suitable manner. A hoist assembly 16 is supported by a carriage 18 which is adapted for operative engagement with a horizontal web 20 of the I-beam 14. The carriage 18 is further slidable along the entire length of the I-beam 14. The hoist assembly 16 includes a drum 22, a rope or cable 24 which may be wound or unwound upon the drum 22, and a electric motor having a portable hanging control means (not shown) for actuating the drum 22.

As can be best seen from FIG. 1, a hook 28 is attached to the lower end of the cable 24 and which is releasably engaged with a second hook 30 having an eye 32. The eye 32 is joined to one end of links 34 and 36. The opposite ends of the respective links are pivotally connected to one end of respective levers 38 and 40. The other end of the levers are provided with flanges 42 for seating against the bottom of the tire during the lifting operation. At substantially the intermediate area of the levers 38 and 40, a fulcrum bar 44 joins the two levers for facilitating the adjustment of the distance therebetween in order to accomodate the different size tires. The combination of the links 34, 36; the levers 38, 40; and the fulcrum bar 44 are adapted to function as tongs for raising and lowering a tire 46 into a tank 48 of water via the operation of the cable 24 in the hoist assembly 16.

A vertical supporting member 50 is mounted to the column 10 and has a transverse arm 52 pivotally connected thereto at its upper end. The lower end of the member 50 is secured to one end of a horizontal supporting means such as beam 54. The other end of the arm 52 is attached fixedly to the mid-portion of the beam 54. The beam 54 supports a power device such as cylinder and piston assembly 56 which is depicted in the drawings as a hydraulic or pneumatic cylinder 58 having a piston rod 60 for vertical movement therein. The piston rod 60 has its one end 61 connected to a spider 62 for applying a pushing force onto the tire 46 in order to submerge the same in the water of the tank 48.

Adjacent the end 61 of the piston rod 60, there is provided a flange 64 having its ends connected to the respective ends of cables 66 and 68. On the upper end of the cylinder 58, a pair of rollers 70 are provided over which the cables 66 and 68 run. Further, a similar pair of rollers 72 are spaced at a given distance from the rollers 70 over which the cables 66 and 68 likewise run. The pairs of rollers 70 and 72 are joined together by a structural support element 74. Each of the rollers 72 are connected to one end of a downwardly extending support member 76. The other ends of the respective support members 76 support hollow cylinders 78. Inside of the cylinder 78, there are disposed cylindrical counterweights 80 which are adapted for vertical movement within the hollow cylinder 78 and are connected operatively to the other ends of the cables 66 and 68.

A control device 82 having a knob or lever 84 is mounted on the beam 84 opposite the column member 10 for energizing the cylinder and piston assembly 56 to urge the piston rod and the spider downwardly against the top of the tire 46 thereby forcing the entire tire beneath the level of the water in the tank 48. In order to control and set the amount of pressure to be applied by the control device 82 upon actuation of the lever 84, a pressure regulator 86 is secured to the intermediate area of the transverse arm 52.

With reference to our previously mentioned patent and from a consideration of the puncture locating apparatus as shown in FIGS. 1 through 4, a full and complete understanding of the operation of the apparatus will be seen. Prior to the operating cycle of the cylinderand piston assembly 56, it is assumed that a tire has been lifted by the hoist assembly 16 and the tong functioning device, positioned over the tank 48 in alignment therewith, and then lowered into the tank so that it floats upon the water. Next, the tong functioning device is removed from the tire 46 and raised to a vertical position whereupon the carriage 18 is transferred to the position as depicted in FIG. 1. It should be noted that the horizontal support member 54 and the spider 62 are movable from side to side from a first position (FIG. 1) to a second position (FIG. 4) directly above the tank 48 and the tire 46. The support member 54 and the spider 62 can be releasably locked in the second position by any suitable and well-manner.

Figure 3:
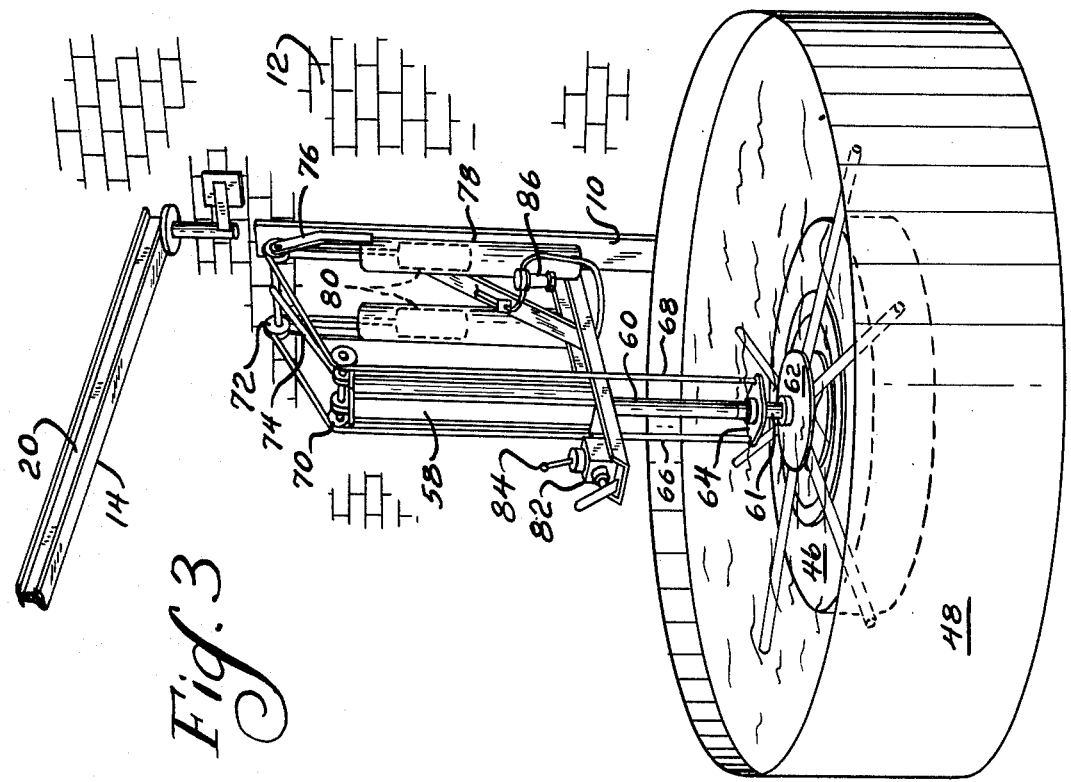
FIG. 3 is a perspective view of the apparatus as shown in FIG. 1 with the spider submerging the tire.

With the spider 62 thus aligned over the tire 46 in the tank 48 (FIG. 2), the cylinder and piston assembly 56 is energized by the lever 84 for urging the spider downwardly against the top of the tire in order to submerge the tire. The pressure regulator 86 can be adjusted to set the amount of pressure needed to submerge the tire dependent upon its weight and size. Thus, accurate and precise control of the pressure is achieved to facilitate the smooth and easy lowering of the tire beneath the level of the water. As best seen in FIG. 3, when the piston rod 60 and the spider 62 are in the lower position, the counterweights 80 are raised to a position adjacent the top or upper ends of the hollow cylinders 78.

Now, any leaks or punctures in the tire 48 can be located and marked for identification by observing the stream of air bubbles emerging therefrom. After this point, the cylinder and piston assembly 56 is de-energized which causes the counterweights 80 in the cylinder 78 to fall due to gravity and thus facilitates the raising or returning of the piston rod 60 and the spider 62 to the upward position. Thus, it can be seen that there has been eliminated the need to depend solely upon the bouyancy force exerted by the tire to raise the piston rod and the spider. Particularly, this is a very desirable feature in cases where the tire is small so that the force may not be sufficient to perform such lifting. The hoist assembly to perform such lifting. The hoist assembly 16 and tong functioning device is then utilized to reengage the tire 46 and lift the same from the tank 48. This cycle can be repeated for checking the punctures on the next tire.

From the foregoing description of the puncture rotating apparatus embodying the present invention, it can be seen there is provided a new and novel puncture locating device having a pressure regulator for controlling the pressure applied by the power device in order to render an accurate lowering of the tire into the water. Further, cylindrical counterweights are positioned within hollow cylinders to facilitate the returning of the piston rod and the spider to the raised position thus avoiding the strict reliance upon the bouyancy force exerted by the tire to perform the lifting.

While there has been illustrated and described what is at present to be a preferred embodiment of the present invention, it will be understood by those skilled in the art that various changes and modifications may be made, and equivalents may be substituted for elements thereof without departing from the true scope of the invention.

In addition, many modifications may be made to adapt a particular illustration or material to the teachings of the invention without departing from the central scope thereof.

Therefore, it is intended that this invention not be limited to the particular embodiment disclosed as a best mode contemplated for carrying out this invention, but that the invention will include all embodiments falling within the scope of the appended claims.

What is claimed is:

1. An apparatus for locating leaks in a tubeless tire comprising;
    means for lifting a tire into a tank of water;
    power means operatively connected to a spider for urging the tire downwardly beneath the level of the water in the tank;
    said power means including a cylinder and a piston rod, said piston rod having one end thereof connected to the spider and being adapted for vertical movement between a first position and a second position;
    a pressure regulator being connected to the cylinder for controlling accurately the amount of pressure applied by the cylinder upon the tire;
    means operatively connected to said cylinder and said piston rod for returning them from the second position to the first position upon de-activation of said cylinder and said piston rod; and
    said returning means including a pair of counterweights adapted for lifting the piston rod and the spider.

2. An apparatus as claimed in claim 1, further including a pair of hollow cylinders in which the counterweights move vertically between a first position and a second position.

3. An apparatus as claimed in claim 1, wherein said returning means further includes a pair of cables, each of said cable having one of its ends connected to a respective one of the pair of counterweights and having its other end connected to the piston rod, and roller means on which the cables are carried for facilitating movement of the counterweights between a first and a second position.

4. An apparatus as claimed in claim 3, further including a pair of hollow cylinders in which the counterweights move vertically between the first position and the second position.

* * * * *